US012670042B2

(12) United States Patent
Kumar

(10) Patent No.: US 12,670,042 B2
(45) Date of Patent: Jun. 30, 2026

(54) INTEGRATED APPLICATION SYSTEM ARCHITECTURE

(71) Applicant: Express Scripts Strategic Development, Inc., St. Louis, MO (US)

(72) Inventor: Ghanshyam Kumar, Orlando, FL (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 502 days.

(21) Appl. No.: 18/143,685

(22) Filed: May 5, 2023

(65) Prior Publication Data

US 2024/0370324 A1    Nov. 7, 2024

(51) Int. Cl.
G06F 9/54        (2006.01)

(52) U.S. Cl.
CPC ..................................... G06F 9/546 (2013.01)

(58) Field of Classification Search
CPC ....................................................... G06F 9/546
USPC ......................................................... 719/313
See application file for complete search history.

(56) References Cited

U.S. PATENT DOCUMENTS

| | | | |
|---|---|---|---|
| 8,126,722 B2 | 2/2012 | Robb | |
| 9,244,730 B2 | 1/2016 | Lai | |
| 10,009,227 B2 | 6/2018 | Akella | |
| 10,296,327 B2 | 5/2019 | Govindaraju | |
| 10,621,013 B2 | 4/2020 | Lavoie | |
| 2001/0040629 A1* | 11/2001 | Miyagi .............. H04N 1/32128 |
| | | | 348/333.02 |

| | | | |
|---|---|---|---|
| 2002/0095567 A1* | 7/2002 | Royer ................... H04L 63/168 |
| | | | 713/150 |
| 2004/0225629 A1* | 11/2004 | Eder ...................... G06N 5/022 |
| | | | 706/45 |
| 2007/0078696 A1 | 4/2007 | Hardin, Jr. | |
| 2008/0101565 A1* | 5/2008 | Tyler ..................... H04M 11/10 |
| | | | 379/93.01 |
| 2008/0140448 A1* | 6/2008 | Hernandez ............. G16H 50/30 |
| | | | 705/2 |

(Continued)

OTHER PUBLICATIONS

Good, Goal-Oriented Organization Design; https://www.businessprocessglossary.com/13809/goal-oriented-organization-design-good, accessed at least as early as Dec. 12, 2022.

(Continued)

*Primary Examiner* — Tuan C Dao
(74) *Attorney, Agent, or Firm* — Harness IP

(57) ABSTRACT

A method of transmitting automated communications within an integrated application system architecture includes identifying, by processor hardware, each of multiple applications in an integrated application system architecture. For each identified application, the method includes obtaining at least one input to the identified application and at least one output to the identified application, defining a result set for the identified application, and storing the result set an as entry in a result map set of memory hardware. The method includes determining a result mesh according to each result set stored in the result map set, receiving an entity processing request, executing, via a first one of the multiple applications, the at least one workflow process associated with the first one of the multiple applications, to process the entity processing request and generate a first application process result, and transmitting an automated communication to a second one of the multiple applications.

22 Claims, 9 Drawing Sheets

(56)        References Cited

U.S. PATENT DOCUMENTS

| | | | | |
|---|---|---|---|---|
| 2009/0070337 | A1* | 3/2009 | Romem | G06F 16/24539 |
| 2009/0276243 | A1* | 11/2009 | Fotsch | G16H 50/80 |
| | | | | 715/205 |
| 2010/0064357 | A1 | 3/2010 | Baird | |
| 2010/0161684 | A1* | 6/2010 | Zuccante | G06F 16/217 |
| | | | | 707/812 |
| 2010/0306249 | A1* | 12/2010 | Hill | G06Q 10/40 |
| | | | | 707/769 |
| 2011/0047221 | A1* | 2/2011 | Watanabe | H04L 67/565 |
| | | | | 709/228 |
| 2013/0311207 | A1 | 11/2013 | Kemp | |
| 2014/0025770 | A1* | 1/2014 | Warfield | H04L 45/74 |
| | | | | 709/213 |
| 2015/0026056 | A1* | 1/2015 | Calman | G06Q 20/3223 |
| | | | | 705/42 |
| 2015/0178052 | A1 | 6/2015 | Gupta | |
| 2015/0363566 | A1* | 12/2015 | Johnson | G16H 20/30 |
| | | | | 705/3 |
| 2017/0220540 | A1* | 8/2017 | Wang | G06F 40/174 |
| 2017/0236063 | A1* | 8/2017 | Dorris | G16H 20/30 |
| | | | | 706/11 |
| 2020/0028691 | A1 | 1/2020 | Rao | |
| 2020/0320470 | A1* | 10/2020 | Whitney | G06F 9/547 |
| 2021/0117563 | A1* | 4/2021 | Moresmau | G06F 21/6218 |
| 2021/0209835 | A1* | 7/2021 | Fonseka | G06T 17/20 |
| 2021/0373982 | A1* | 12/2021 | Neilson | G06F 12/0833 |
| 2022/0286458 | A1* | 9/2022 | O'Connor | H04L 63/102 |

OTHER PUBLICATIONS

Greenwood, What "goal-oriented" BPM means, from a business perspective, https://www.whitestein.com/?q=blog/what-goal-oriented-bpm-means-business-perspective#:~:text=Goal%2Doriented%20BPM%20executes%20the,to%20situational%20context%20and%20resources; Mar. 21, 2016.

What is goal-oriented business process management?, https://www.swiftcase.co.uk/2018/02/14/what-is-goal-oriented-business-process-management, Feb. 14, 2018.

* cited by examiner

Pallet Sizing And Pucking Device(s) — 206

Loading Device(s) — 208

Inspect Device(s) — 210

Unit of Use Device(s) — 212

Automated Dispensing Device(s) — 214

Manual Fulfillment Device(s) — 216

Review Devices — 218

Imaging Device(s) — 220

Cap Device(s) — 222

Accumulation Devices — 224

Packing Device(s) — 226

Literature Device(s) — 228

Unit of Use Packing Device(s) — 230

Mail Manifest Device(s) — 232

112

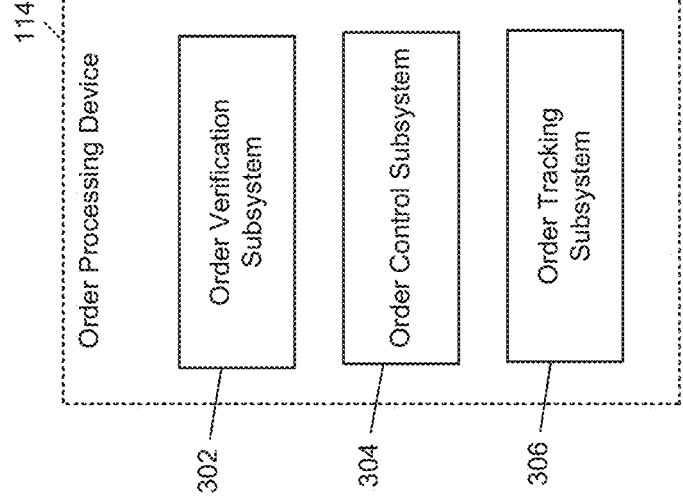
FIG. 3

706

{
"PublisherName": "Application A",
"Result_Communication": {
"UniqueId":"b4ca1ec0-8612-4189",
"What":"Prescription Creation",
"Why":"Benefit Completed",
"When":"112120XX 11:15 CST,
"How":"1Systematic completion",
}
}

| Process 1 Result | Process 2 Result | Process 3 Result | Integrated Result |
|---|---|---|---|
| Benefit Completed | Prescription Created | Invalid Payer | Retrigger the Benefits Review |
| Unenroll | Cancel Prescription | Communication | Unenroll Completion |

| Input 1 | Input 2 | Result |
|---|---|---|
| Process Name A | Scenario Type | Notify System A |
| Process Name B | Failure | Notify System B |

FIG. 7A

INTEGRATED APPLICATION SYSTEM ARCHITECTURE

FIELD

The present disclosure relates to integrated application system architectures, including distributed application systems.

BACKGROUND

Distributed application systems include multiple individual processes which may be integrated with one another, such as a business process management system. Distributed application systems may lack integrated traceability due to, e.g., a lack of outcomes from various individual components of the system, which may lead to delays in processing, a lack of visibility, a lack of traceability and observability, process failures, unmanaged work processing, etc.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An integrated application system architecture including multiple applications integrated with one another via multiple automated communication channels, each of the multiple applications configured to execute at least one workflow process associated with the application, memory hardware configured to store a result map set, a result mesh, and computer-executable instructions, and processor hardware configured to execute the computer-executable instructions to identify each of the multiple applications in the integrated application system architecture. For each identified application, the processor hardware is configured to obtain at least one input to the identified application and at least one output to the identified application, define a result set for the identified application according to the at least one input, the at least one output, and the at least one workflow process associated with the application, and store the result set an as entry in the result map set. The processor hardware is configured to determine the result mesh according to each result set stored in the result map set, receive an entity processing request, execute, via a first one of the multiple applications, the at least one workflow process associated with the first one of the multiple applications, to process the entity processing request and generate a first application process result, and transmit an automated communication to a second one of the multiple applications, the automated communication including the first application process result.

In other features, the processor hardware is configured to execute the computer-executable instructions to execute, via a second one of the multiple applications, the at least one workflow process associated with the second one of the multiple applications, to process the entity processing request and generate a second application process result, and transmit an automated communication to a third one of the multiple applications, the automated communication including the first application process result and the second application process result.

In other features, the automated communication includes an application programming interface synchronous communinication or a service call synchronous communication. In other features, the automated communication includes an application programming interface asynchronous communication or a service call asynchronous communication.

In other features, the automated communication includes at least one of a message queue destination, a Kafka message, a fire and forget application programming interface call, a fire and forget service call, or an event-based interaction communication. In other features, the result map set is stored in a structured data format in a database of the memory hardware. In other features, the result map set is stored in an unstructured data format in a database of the memory hardware.

In other features, the first application process result includes at least one of a workflow processing failure identifier and a workflow processing success identifier. In other features, the result mesh includes all combinations of processing paths for the entity processing request through one or more of the multiple applications, according to multiple result sets corresponding to the multiple applications as stored in the result map set.

In other features, the multiple applications are integrated in a business process management (BPM) system architecture. In other features, the BPM system architecture includes a pharmaceutical claim processing system. In other features, the memory hardware is configured to store the result map set and the result mesh as a PEGA system decision table.

In other features, the processor hardware is configured to execute the computer-executable instructions to receive an entity processing status query, obtain at least one automated communication from one of the multiple applications, the at least one automated communication associated with the entity processing request corresponding to the entity processing status query, and return an entity processing result status according to one or more application process results included in the at least one automated communication.

A method of transmitting automated communications within an integrated application system architecture includes identifying, by processor hardware, each of multiple applications in an integrated application system architecture, the multiple applications integrated with one another via multiple automated communication channels, each of the multiple applications configured to execute at least one workflow process associated with the application. For each identified application, the method includes obtaining at least one input to the identified application and at least one output to the identified application, defining a result set for the identified application according to the at least one input, the at least one output, and the at least one workflow process associated with the application, and storing the result set an as entry in a result map set of memory hardware. The method includes determining a result mesh according to each result set stored in the result map set, receiving an entity processing request, executing, via a first one of the multiple applications, the at least one workflow process associated with the first one of the multiple applications, to process the entity processing request and generate a first application process result, and transmitting an automated communication to a second one of the multiple applications, the automated communication including the first application process result.

In other features, the method includes executing, via a second one of the multiple applications, the at least one workflow process associated with the second one of the multiple applications, to process the entity processing request and generate a second application process result, and transmitting an automated communication to a third one of the multiple applications, the automated communication including the first application process result and the second application process result.

In other features, the automated communication includes an application programming interface synchronous communication or a service call synchronous communication. In other features, the automated communication includes an application programming interface asynchronous communication or a service call asynchronous communication.

In other features, the automated communication includes at least one of a message queue destination, a Kafka message, a fire and forget application programming interface call, a fire and forget service call, or an event-based interaction communication. In other features, the result map set is stored in a structured data format in a database of the memory hardware. In other features, the result map set is stored in an unstructured data format in a database of the memory hardware.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3 is a functional block diagram of an example order processing device, which may be deployed within the system of FIG. 1.

FIG. 7A is a chart of an example result map set for a distributed application.

FIG. 7B is a chart of an example result mesh for an integrated application system architecture including multiple distributed applications.

FIG. 7C is a block diagram illustrating an example communication between distributed applications in an integrated application system architecture.

In the drawings, reference numbers may be reused to identify similar and/or identical elements.

DETAILED DESCRIPTION

High-Volume Pharmacy

Figure 1:
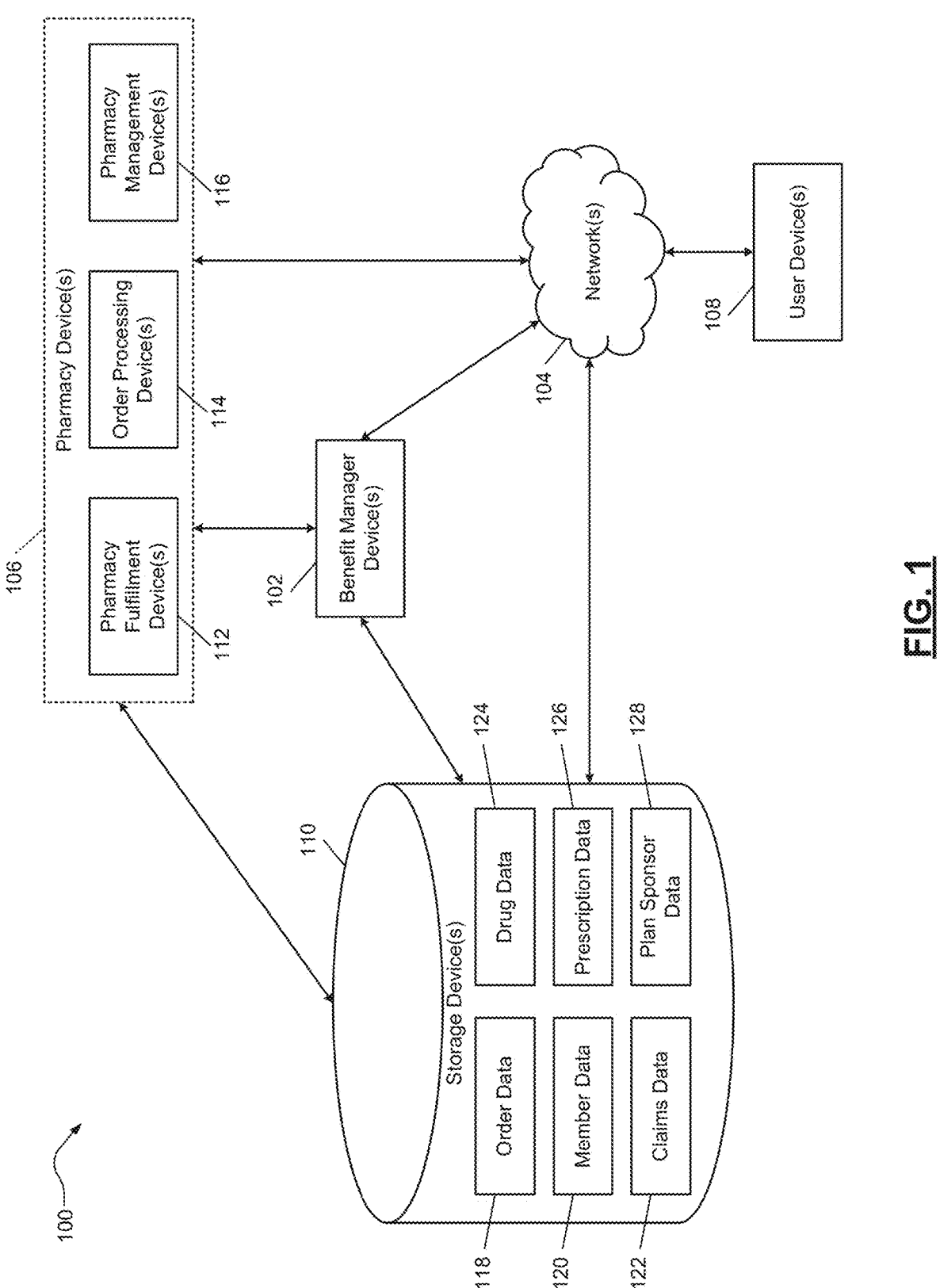
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug is successfully adjudicated. The aforementioned adjudication operations generally occur before the copayment is received and the prescription drug is dispensed. However, in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally, or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
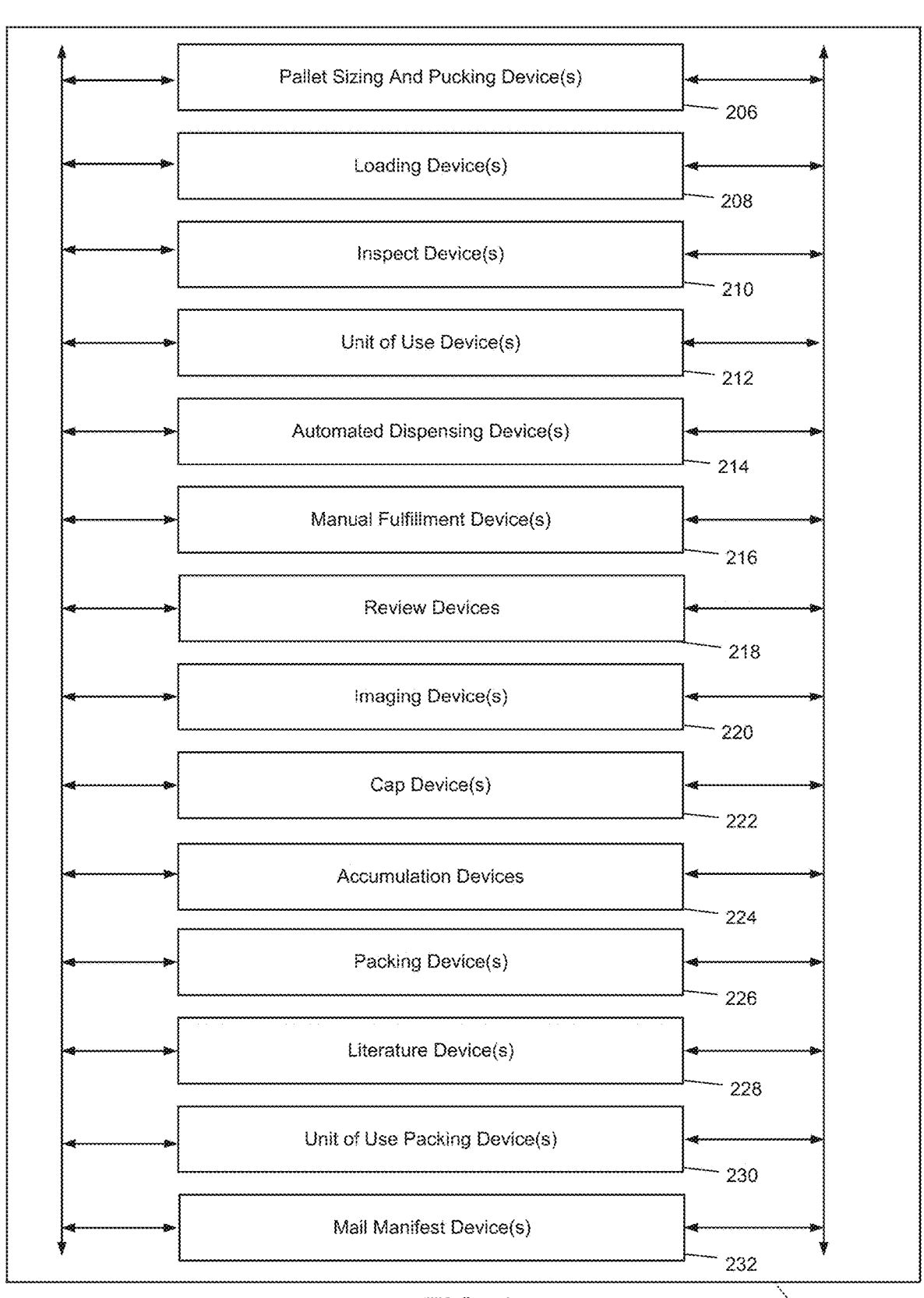
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device (s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Integrated Application System Architecture

In some example distributed application systems, such as a business process management (BPM) system, multiple applications may be integrated where end-to-end processing is dependent on success of multiple individual processes. An application may refer to a specific application, a specific process, a specific software component, a specific processing system, etc.

If a process failure occurs, an originator or consumer or any other destination may not be able determine a reason for the failure or a history of processing an entity (e.g., an object, a processing request, etc.) withing the system, and it is difficult of perform end-to-end tracking of an entire life cycle of the object during processing within the system. Any exception in that occurs in the process flow can cause an unexpected resolution of the process.

In order to address technical problems, some example embodiments herein describe a result oriented or outcome based architecture (e.g., BPM architecture). While a traditional BPM system may focus on workflow automation, some example embodiments herein are configured to facilitate integration of multiple process workflows based on, e.g., defined results of the process workflows. Incorporation of processing workflow results may provide flexibility in a distributed system to adopt a process for closing a loop between multiple applications within the distributed system (e.g., multiple nodes or application nodes of the system), and provide end-to-end traceability of process.

For example, a result oriented BPM system (or other distributed system) may provide flexibility to build integrated systems and infrastructure with outcome based responsibility for each application, and traceability that maintains process information at various applications within the distributed system (e.g., via communications between applications that include result or outcome based process information, etc.). As an example, an integrated application system architecture may be implemented in a pharmaceutical claims processing system, although example embodiments are not limited thereto.

Figure 4:
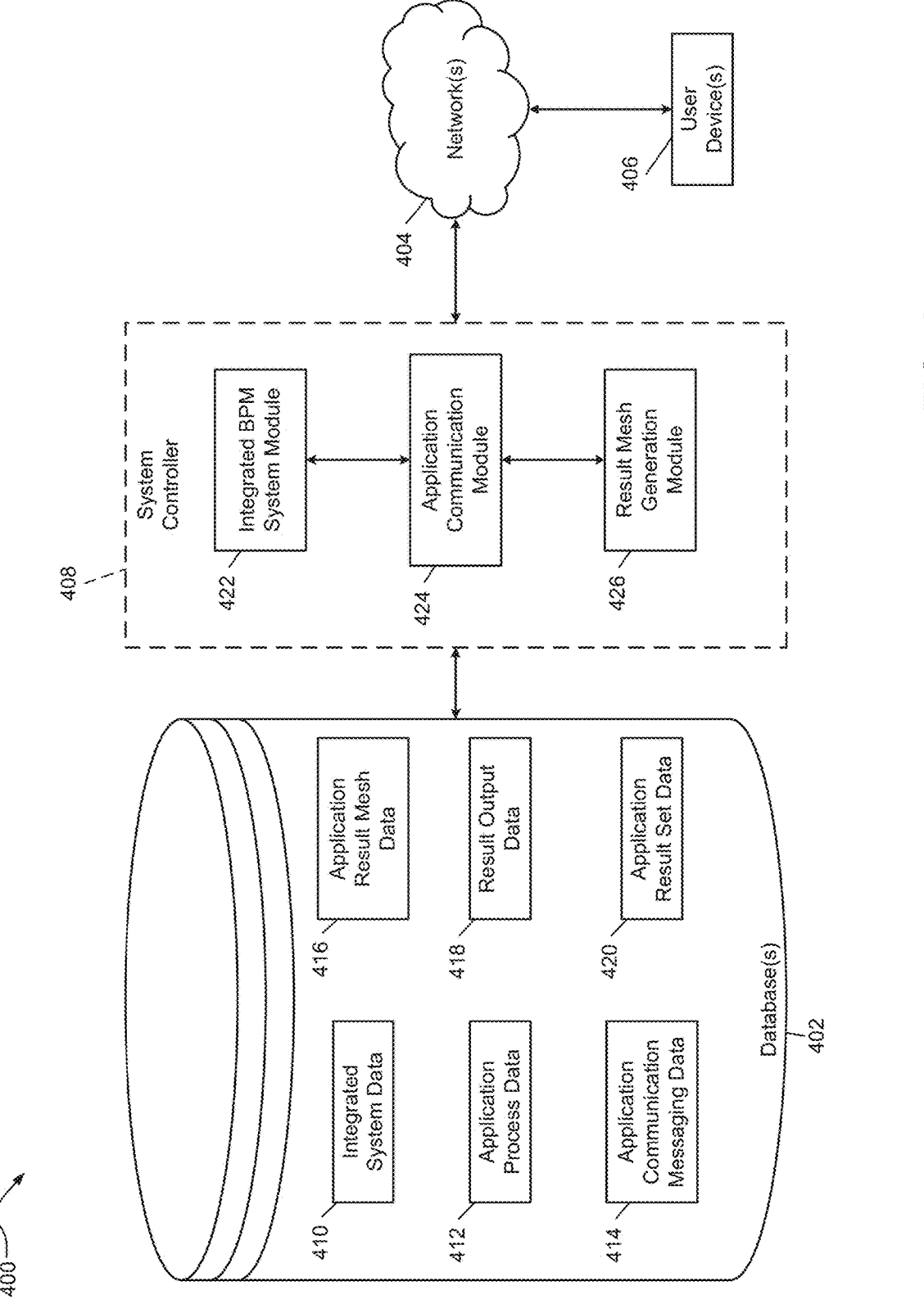
FIG. 4 is a functional block diagram of an integrated application system architecture for a distributed application system.

FIG. 4 is a functional block diagram of an example system 400 including an integrated application system architecture for a distributed application system, which includes a database 402. While the system 400 is generally described as being deployed in a computer network system, the database 402 and/or components of the system 400 may otherwise be deployed (for example, as a standalone computer setup). The system 400 may include a desktop computer, a laptop computer, a tablet, a smartphone, etc.

As shown in FIG. 4, the database 402 stores integrated system data 410, application process data 412, application communication messaging data 414, application result mesh data 416, result output data 418, and application result set data 420. In various implementations, the database 402 may store other types of data as well.

The integrated system data 410, application process data 412, application communication messaging data 414, application result mesh data 416, result output data 418, and application result set data 420 may be located in different physical memories within the database 402, such as different random access memory (RAM), read-only memory (ROM), a non-volatile hard disk or flash memory, etc. In some implementations, the integrated system data 410, application process data 412, application communication messaging data 414, application result mesh data 416, result output data 418, and application result set data 420 may be located in the same memory (such as in different address ranges of the same memory). In various implementations, the integrated system data 410, application process data 412, application communication messaging data 414, application result mesh data 416, result output data 418, and application result set data 420 may each be stored as structured or unstructured data in any suitable type of data store.

The integrated system data 410 may include any suitable data describing an arrangement of components of the integrated application system architecture, such as identities of applications within the distributed system, connections or communications between applications, etc. The application process data 412 may include any suitable data describing, e.g., types of processes performed by various components of the integrated application system architecture, such as workflow processes of the different applications of the distributed system, etc.

The application communication messaging data 414 may include any suitable data describing, e.g., different types of communication between different components of the integrated application system architecture. For example, different nodes of the distributed system may communicate with one another via, e.g., synchronous or asynchronous application programming interface (API) calls or service calls, message queue (MQ) destinations, Kafka topics, fire and forget API calls or service calls, event based interaction messaging, etc.

At the end of any workflow process, the executing process, application, system, etc., may send a result of the workflow process execution to at least one other integrated application of the distributed system, such as via one of the example communication mechanisms described above. The communication may include information about the result or outcome of the workflow process, and may optionally include information about the result or outcome of previous workflow processes executed on the same entity or object at other applications of the distributed system (e.g., to provide traceability of the entity or object as it moves through the various components of the distributed system).

In some example embodiments, cumulative outcomes for multiple systems may be stored differently depending on the overall architecture. For example, with micro services, and independent rule management system may store the cumulative outcome of multiple result outcomes for multiple workflow processes, and the cumulative outcome may be exposed as service for any consumers.

For BPM tools such as PEGA, which may follow a reusable layer, the system may store rules in an enterprise/division/unit layer, which may be easily accessible for any consumer or application developed as a code base inherited from the enterprise/division/unit layer. In some example embodiments, applications may store the results in an integrated database which uses a continuous data sync between a source database and an application database.

Example information in the communication may include, but is not limited to, what workflow process(es) were performed and/or results occurred, why the specific workflow process(es) were performed and/or results occurred, when the specific workflow process(es) were performed and/or results occurred, how the specific workflow process (es) were performed and/or results occurred, etc. An example communication is illustrated in FIG. 7C, and described further below.

The application result output data 418 may include any suitable data for defining, e.g., outputs of various nodes of the integrated application system architecture. For example, a result could include any expected or unexpected outcome of a process of a distributed system node, which may contribute towards defining the state of an entity (e.g., an object, a processing request such as a pharmaceutical claim, etc.). The results are not limited to objects only, and may include any events, processes, functions, services, etc.

The application result set data 420 may include a combination of multiple possible results for an application of the distributed system. For example, a result map set may include a combination of possible results of a process workflow of the application. The result map set may be stored in a structured data format and/or an unstructured data format. An example result map set is illustrated in FIG. 7A, and described further below.

Referring again to FIG. 4, the application result mesh data 416 may include a combination of multiple result map sets for multiple applications within the distributed system. For example, the result mesh may include a mapping based collection of a portion or all possible combination of results for the multiple applications of the distributed system. In various implementations, multiple result meshes may be created depending on complexity of the integrated network.

Figure 8:
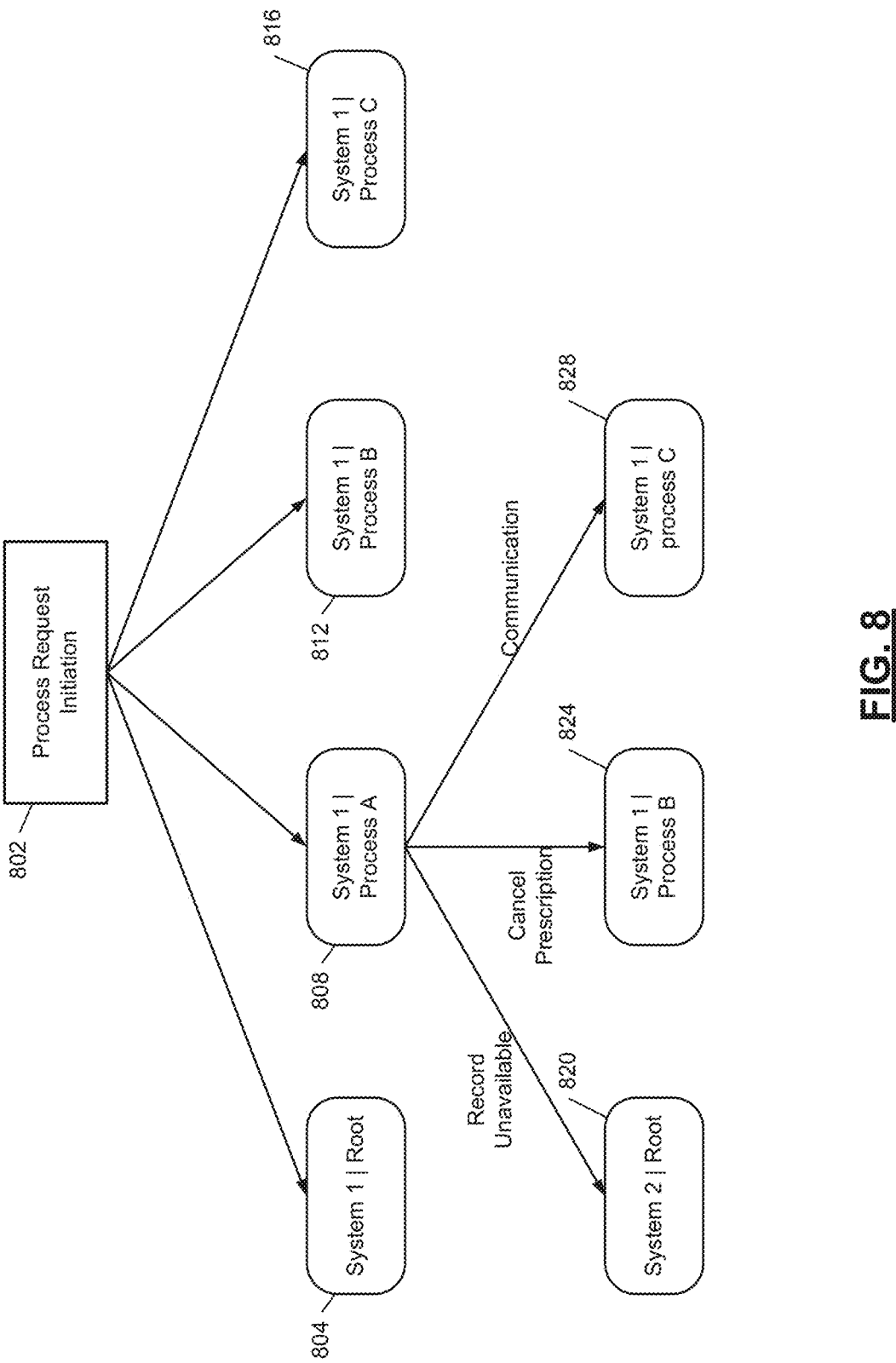
FIG. 8 is a block diagram of an example result mesh tree for distributed applications in an integrated application system architecture.

The result mesh may be implemented in any suitable format, such as a chart, a rule format, a tree format, etc. An example result mesh chart is illustrated in FIG. 7B and described further below, and an example result mesh tree format is illustrated in FIG. 8 and described further below.

Referring again to FIG. 4, a system controller 408 may include one or more modules, including an integrated BPM system module 422, an application communication module 424, and a result mesh generation module 426. These example modules are provided for purposes of illustration, and other embodiments may include more or less modules, functions of different software features implemented in other modules or controller locations, more than one system controller, more than one database, data distributed to other databases, etc.

The integrated BPM module 422 may be configured to execute one or more processes, applications, etc., of an integrated application system architecture for a distributed application system. For example, the integrated BPM system module 422 may receive an entity processing request (or other object), such as via one or more APIs, and facilitate transmission of the entity processing request though various workflows at different applications of the distributed system.

The application communication module 424 may be configured to manage communications between the various components of the distributed system. For example, the application communication module 424 may control types of messaging communications transmitted between various applications, types of workflow process result information included in the communications, etc.

The result mesh generation module 426 may be configured to generate a result mesh that includes a portion or all possible combination of results for each workflow of the applications of the distributed system. For example, the result mesh generation module 426 may combine result map sets for various applications to generate the result mesh. An example result mesh chart is illustrated in FIG. 7B and described further below, and an example result mesh tree format is illustrated in FIG. 8 and described further below.

Referring again to FIG. 4, a user device 406 may include any suitable user device for displaying text and receiving input from a user, including a desktop computer, a laptop computer, a tablet, a smartphone, etc. In various implementations, the user device 406 may access the database 402 or the system controller 408 directly, or may access the database 402 or the system controller 408 through one or more networks 404. Example networks may include a wireless network, a local area network (LAN), the Internet, a cellular network, etc.

The user device 406 may be used to, e.g., submit an entity processing request to the integrated application system architecture, to display a trace report of an entity processing request within the integrated application system architecture (or after a successful or unsuccessful outcome of workflow processing within the integrated application system architecture, etc.). For example, the user device 406 may be used by a pharmacist, a physician, a system administrator, etc., to submit and monitor pharmaceutical claims. Although FIG. 4 illustrates a user device 406, in some example embodiments the entity processing requests may be automated from another database or system, etc.

Figure 5:
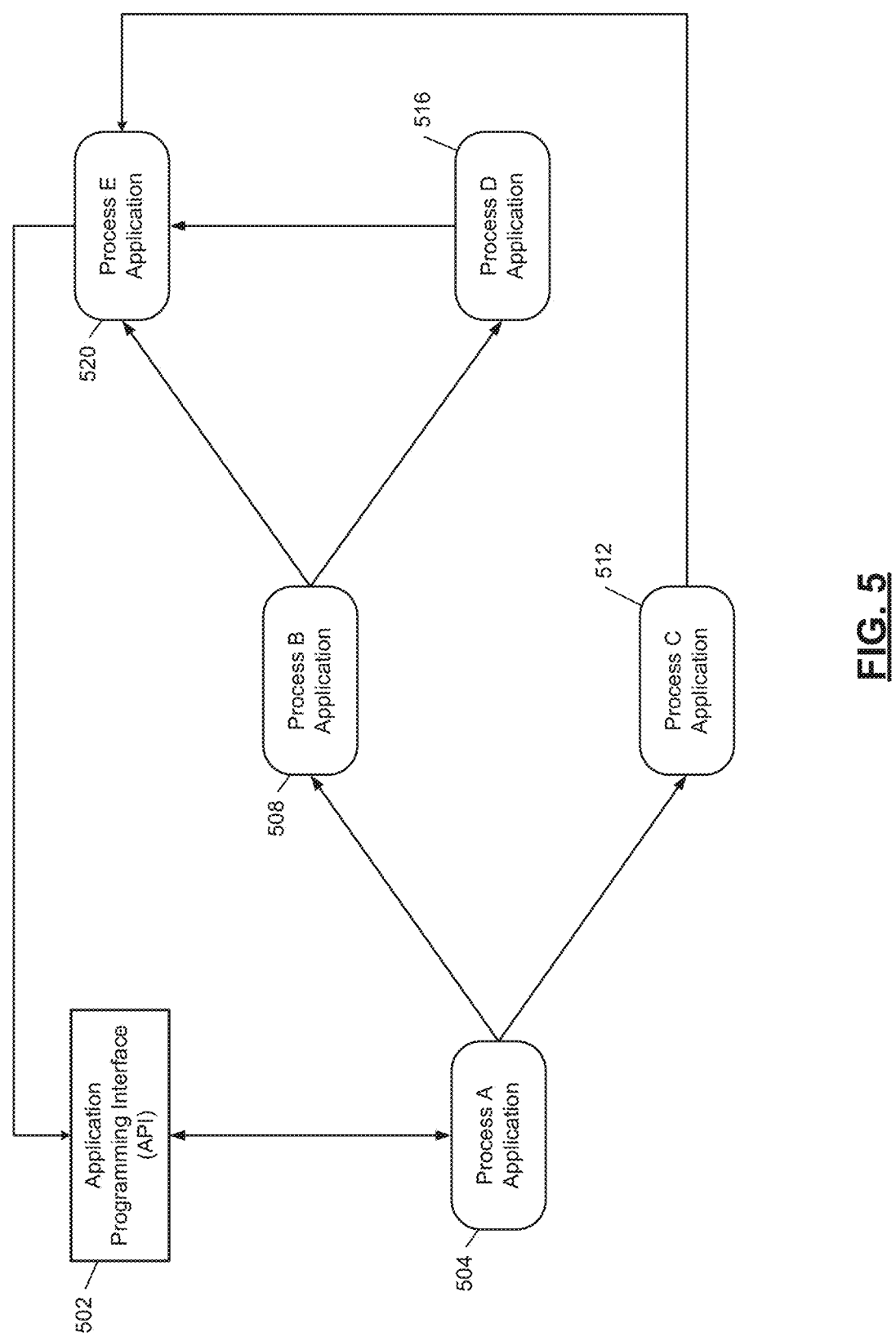
FIG. 5 is a block diagram illustrating example integration between different distributed applications of an integrated application system architecture.

FIG. 5 is a block diagram illustrating example integration between different distributed applications of an integrated application system architecture. As shown in FIG. 5, the distributed system includes an API 502, a process A application 504, a process B application 508, a process C application 512, a process D application 516, and a process E application 520.

Each application may be configured to perform a different workflow process (or multiple workflow processes). For example, the API 502 may be configured to receive an entity processing request including at least one object, and the process A application 504 may be configured to perform a workflow process A on the at least one object of the entity processing request.

The process B application 508 may be configured to perform a workflow process B on the at least one object of the entity processing request, the process C application 512 may be configured to perform a workflow process C on the at least one object of the entity processing request, the process D application 516 may be configured to perform a workflow process D on the at least one object of the entity processing request, and the process E application 520 may be configured to perform a workflow process E on the at least one object of the entity processing request.

FIG. 5 illustrates example communications between the various applications in the distributed system. For example, after process A application 504 executes workflow process A on the object, the results and the object are passed from process A application 504 to process B application 508 and process C application 512.

After process B application 508 executes workflow process B on the object, the results and the object are passed from process B application 508 to process D application 516 and process E application 520. After process C application 512 executes workflow process C on the object, the results and the object are passed from process C application 512 to process E application 520.

After process D application 516 executes workflow process D on the object, the results and the object are passed from process D application 516 to process E application 520. After process E application 520 executes workflow process E on the object, the result and the object are passed to the API 502.

As an example, the API 502 may receive the processed object and an outcome of the overall workflow processing for each application, to determine whether the entity processing request was successfully performed within the distributed system. FIG. 5 illustrates one example embodiment, and other example embodiments may include more or less applications, different communication connections between applications, different or more workflow processes at each application, etc.

In some example embodiments, a workflow process may change for e.g., different pharmacies, based on receiving result outcome information in a communication. For example, for Pharmacy "XYZ", if a present request is a duplicate, then the result outcome of "duplicate" in a communication may instruct the system to change a status to "Pending-Duplicate" and hold it for a specified period of time. This result outcome may be within the system processing, or may be based on the input for, e.g., integrated systems processing.

Figure 6:
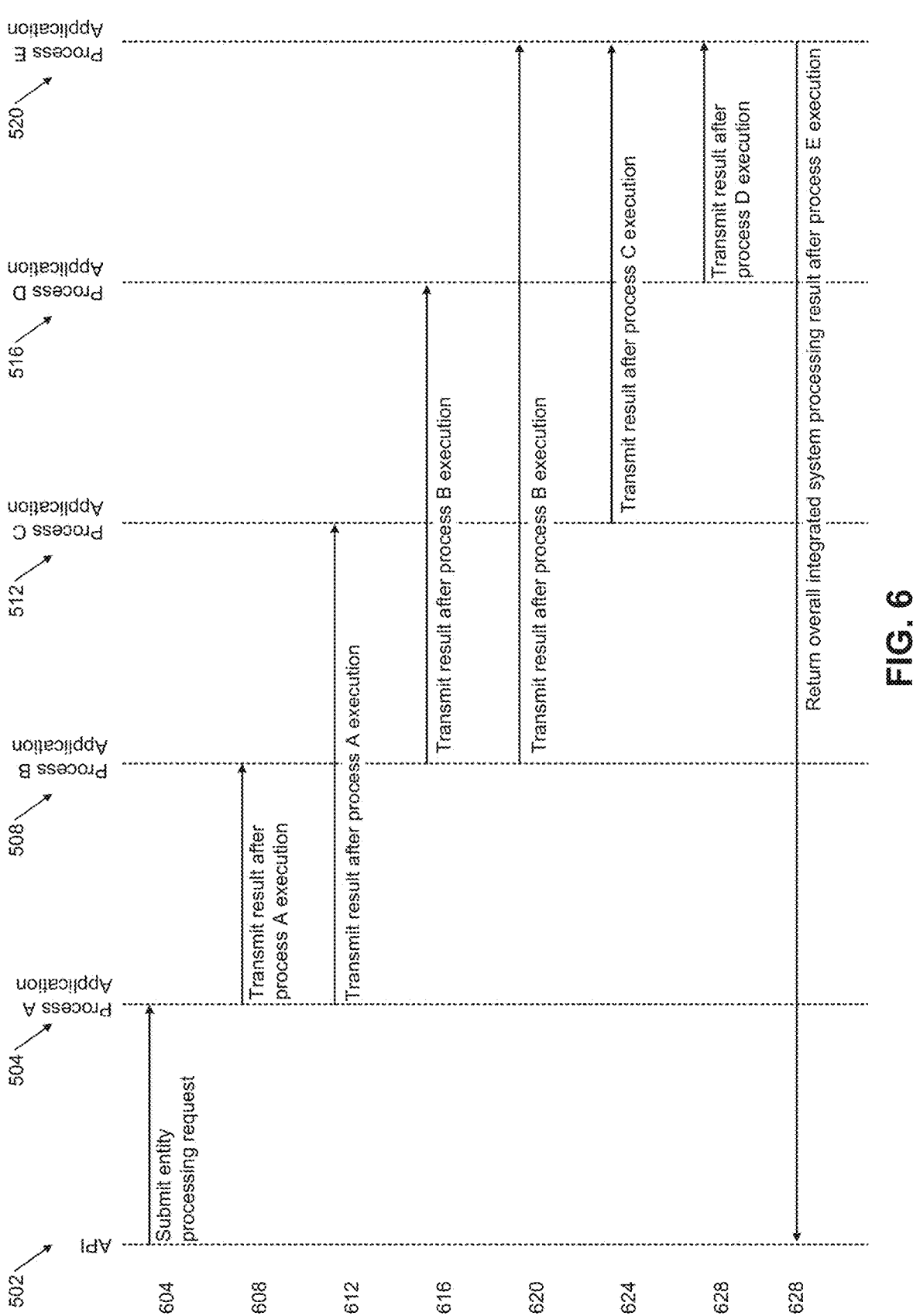
FIG. 6 is a message sequence chart illustrating example communications between the different applications of FIG. 5.

FIG. 6 is a message sequence chart illustrating example communications between the different applications of FIG. 5. As shown in FIG. 6, at line 604 the API 502 is configured to submit an entity processing request to the process A application 504, such as a pharmaceutical claim processing request.

The process A application 504 then executes a process workflow A on the received object. At line 608, the process A application 504 is configured to transmit a result after process A execution to the process B application. At line 612, the process A application 504 is configured to transmit the result after process A execution to the process C application 512.

The process B application 508 executes a workflow process B on the object. At line 616, the process B application 508 is configured to transmit a result after process B execution to the process D application 516. At line 620, the process B application 508 is configured to transmit a result after process B execution to the process E application 520.

The process C application 512 is configured to execute a workflow process C on the object. At line 624, the process C application 512 is configured to transmit a result after process C execution to the process E application 520.

The process D application 516 is configured to execute a workflow process D on the object. At line 628, the process D application 516 is configured to transmit a result after process D execution to the process E application 520.

The process E application 520 is configured to execute a workflow process E on the object. At line 628, the process E application 520 is configured to transmit a result after process E execution to the API 502.

Result Map Set and Result Mesh

FIG. 7A is a chart of an example result map set 702 for a distributed application. The result map set 702 may represent a map of all possible outcomes for workflow processing performed by an application of a distributed system.

As shown in FIG. 7A, when the input 1 to the workflow process is process name A, and the input 2 is a scenario type, an outcome result of the workflow processing is to notify system A. When the input 1 is a process name B, and the input 2 is a failure indication, the outcome result is to notify system B (e.g., send a notification of the failure to system B).

FIG. 7B is a chart of an example result mesh 704 for an integrated application system architecture including multiple distributed applications. The result mesh 704 may represent a combination of multiple result map sets for multiple (or all) applications in the system.

As shown in FIG. 7B, when the process 1 result is benefit completed (e.g., a process 1 performed by a first application resulted in a benefit completed outcome), the process 2 result is prescription created (e.g., a process 2 performed by a second application resulted in a prescription created outcome), and a process 3 result is invalid payer, the integrated result may be to retrigger the benefits review. For example, when a prescription claim request has a completed benefit and prescription created, but an invalid payer, the overall distributed system may be configured to retrigger a benefits review as an integrated outcome (e.g., to review whether the payer is correctly invalid, or if there is other payer information available, etc.).

When the process 1 result is unenroll, the process 2 result is to cancel a prescription, and the process 3 result is a communication, the overall integrated result may be to complete unenrollment. Although FIGS. 7A and 7B illustrate an example result map set an and example result mesh, other example embodiments may include other example result sets, other example result meshes, more or less combinations for results and processes for more or less applications of a distributed system, etc.

FIG. 7C is a block diagram illustrating an example communication 706 between distributed applications in an integrated application system architecture. For example, one application in a distributed system may transmit a communication including information similar to the communication 706 to another application in the distributed system, after completing execution of one or more workflow processes on an object (such as an entity processing request).

As shown in FIG. 7C, the example communication 706 includes a publisher name, and a result. The result includes a unique identifier (e.g., an identifier for an object such as an entity processing request, or an identifier for the specific result or the communication 706 itself), a 'what' description indicating what the result is related to, a 'why' description indicating why the result was generated, a 'when' description providing an indication of when the result was generated, and a 'how' description indicating how the result was generated.

The 'what', 'why', 'when', 'how', etc. descriptors may be defined by a system administrator, etc., and may be linked with various workflow processes performed by different applications. In other example embodiments, the communication 706 may include other suitable descriptor information related to a result.

In some example embodiments, an application may determine which result information to include in a communication based on the configuration or outcome defined in the 'Result set map'. These results may be combinations of business and technical situation possibilities. Some scenarios may not be completely technical, and some may be business scenarios. This input may be defined by engineers, business administrators, etc., to make the set complete and cover any expected or unexpected possibilities. In some situations, like a piece of code, a technical outcome may be defined by engineers, and some other scenarios may have business rules to define the outcomes.

Different fields of the communication may be defined based on the scenarios, such as: What: what happened in the system—may be defined based on the process flow or nature of code handling the logic; Why: why this event happened—may be defined based on the previous action performed and tracked to know the trail of the root cause; When: a time stamp to identify when an event occurred; How: did the event happen due to system processing, or by a user or by any interaction—the system may capture the event based on the present requestor and set of requestors which worked on a process in past. For Pega based application, work parties may be used to get this trail. Example fields for a communication are provided below:

```
{
    "PublisherName": "Application A",
    "Result_Communication": {
    "UniqueId":"b4ca1ec0-8612-4189",
    "What":"Prescription Creation",
    "Why":"Benefit Completed",
    "When":11212022 11:15 CST,
    "How":"1Systematic completion",
        }
}
```

FIG. 8 is a block diagram of an example result mesh tree for distributed applications in an integrated application system architecture. As shown in FIG. 8, a process request initiation 802 may transmit a communication to a system 1 root 804, a system 1 process A 808, a system 1 process B 812, and/or a system 1 process C 816. For example, an entity processing request may be received at the process request initiation 802, and then communicated to various workflow processes for further processing.

Each process or root may include one or more subprocesses, or may communicate a result to one or more other processes. For example, the system 1 process A 808 may transmit a communication of a 'record unavailable' result to a system 2 root 820, may transmit a communication of a 'cancel subscription' result to a system 1 process B 824, and/or may transmit a 'communication' result to a system 1 process C 828.

Although FIG. 8 illustrates further processing for the system 1 process A 808, in other example embodiments there may be more or less processes, each process may provide result communications to other processes, etc. The example result mesh of FIG. 8 may illustrate all possible result communications between integrated applications in the distributed system.

Figure 9:
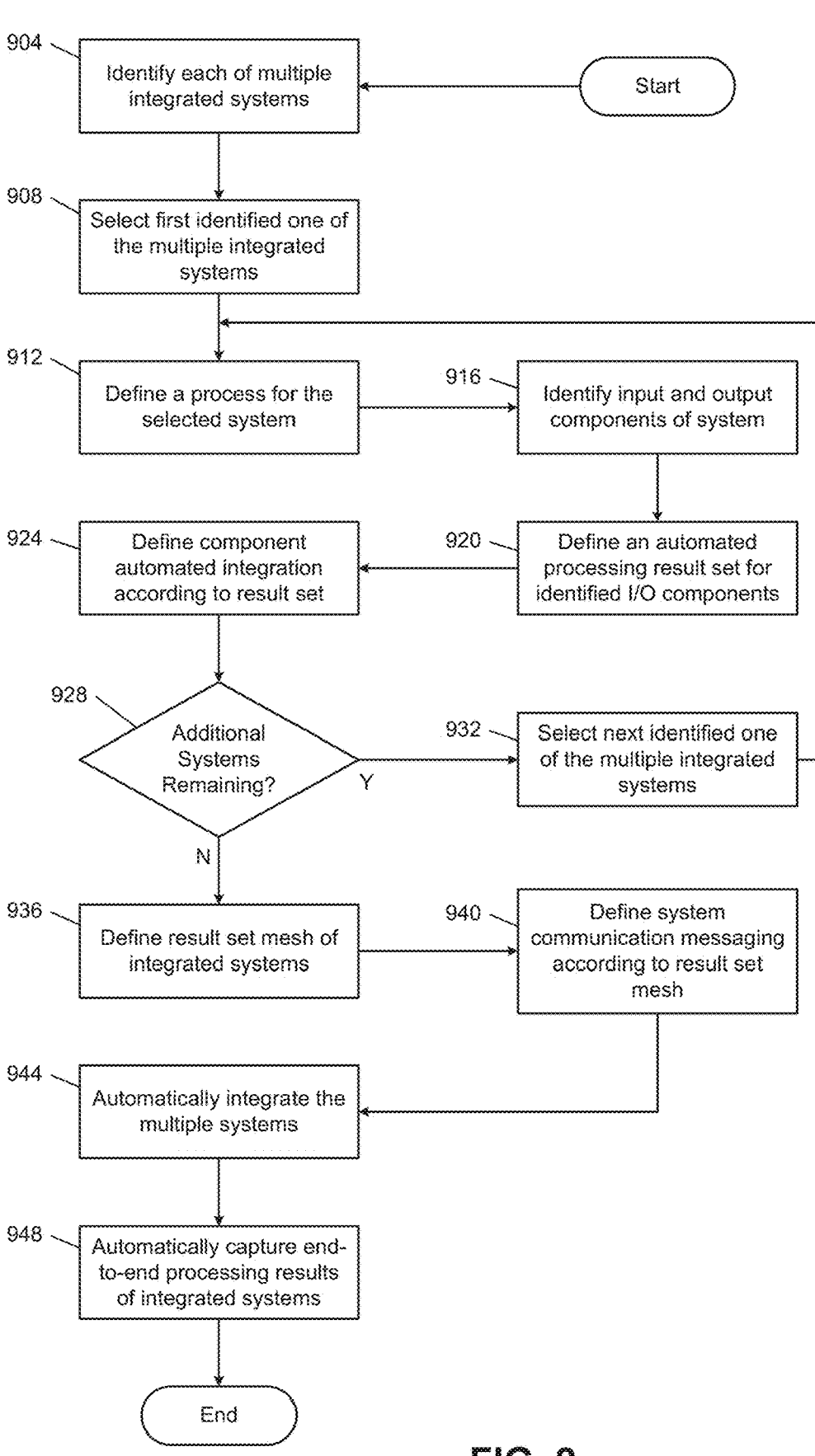
FIG. 9 is a flowchart illustrating an example process for implementing an integrated application system architecture including multiple distributed applications.

FIG. 9 is a flowchart illustrating an example process for implementing an integrated application system architecture including multiple distributed applications, which may be implemented by, e.g., the system controller 408 of FIG. 4. The process begins at 904 by identifying each of multiple integrated systems. For example, control may identify multiple applications in a distributed system.

At 908, control selects a first identified one of the multiple integrated systems. Control then defines a process for the selected system at 912. For example, control may define a workflow process performed by an application of the distributed system.

Control identifies input and output components of the system at 916. For example, control may determine which variable, objects, etc. may be supplied to an application, and all possible result outcomes that may be communicated by an application after execution of one or more workflow processes on an object.

At 920, control defines an automated processing result for identified I/O component. Component automated integration is then defined according to the result set at 924. For example, all possible outcome results of the workflow process(es) may be combined in a result map set, such as the example result map set of FIG. 7A.

At 928, control determines whether any additional systems are remaining. For example, if there are additional applications of the distributed system that do not have a result map set yet, control selects a next identified one of the multiple integrated systems at 932, and returns to 912 to define a process for the selected system.

Once all systems have result map sets generated at 928, control proceeds to define a result set mesh of the integrated systems at 936. For example, control may combine the result map sets of a portion or all of the applications in a distributed system to generate a result mesh, such as the example result meshes illustrated in FIGS. 7B and 8.

At 940, control defines system communication messaging according to the result set mesh. For example, possible communications between applications may be defined based on possible outcome results according to the result mesh. An example communication including a result outcome is illustrated in FIG. 7C.

At 944, control automatically integrates the multiple systems, such as by facilitating communications between the systems as workflow processes are executed on an object. At 948, control captures end-to-end processing results of the integrated systems.

For example, control may allow a user to request a status of an object currently being processed within the system (or that experienced a processing failure), and output a status description to the user indicating one or more result outcomes of the object during processing by the various applications of the distributed system.

In some example embodiments, based on a unique ID of a workflow process, all results for the workflow process may be combined to generate a trail of distributed process details. A user may access this trail to obtain the status of a case, or based on the current status, a result mesh may be used to generate a back track of the possibilities of results of the processing. A back track may not return the exact result, as an end result may be possibly achieved according to multiple processing result situations, but the source triggering the process will get the end result about what happened any why it happened, which may assist in determining the status of a particular case in the system.

The integrated application system architecture may be implemented using any suitable system, such as a PEGA BPM system. For example, outcome results of workflow processes, result map sets, and result meshes may be created in PEGA decision tables to identify the result outcomes of the workflow processes in run time. This architecture and design may be implemented for any BPM solution developed in any programing languages, or using any BPM tool. Event based communication may be utilized for communicating the results to integrated systems.

Based on the result map set for an application, an identified result outcome may be communicated to notify other applications in the distributed system, e.g., by using event communications. Example embodiments described herein may be used for system interactions, small component interactions, etc. The system integration and communication may be automated, may facilitate transparency of processing outcomes in a network, may provide flexibility for managing a processing failure, may be implemented using existing infrastructure to avoid additional costs, etc.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An integrated application system architecture comprising:
    multiple applications integrated with one another via multiple automated communication channels, each of the multiple applications configured to execute at least one workflow process associated with the application;
    memory hardware configured to store a result map set, a result mesh, and computer-executable instructions; and
    processor hardware configured to execute the computer-executable instructions to:
        identify each of the multiple applications in the integrated application system architecture;
        for each identified application:
            obtain at least one input to the identified application and at least one output to the identified application;
            define a result set for the identified application according to the at least one input, the at least one output, and the at least one workflow process associated with the application; and
            store the result set an as entry in the result map set;
        determine the result mesh according to each result set stored in the result map set;
        receive an entity processing request;
        execute, via a first one of the multiple applications, the at least one workflow process associated with the first one of the multiple applications, to process the entity processing request and generate a first application process result;
        transmit an automated communication to a second one of the multiple applications, the automated communication including the first application process result;
        receive an entity processing status query;
        obtain at least one automated communication from one of the multiple applications, the at least one automated communication associated with the entity processing request corresponding to the entity processing status query; and
        return an entity processing result status according to one or more application process results included in the at least one automated communication.

2. The integrated application system architecture of claim 1, wherein the processor hardware is configured to execute the computer-executable instructions to:
    execute, via a second one of the multiple applications, the at least one workflow process associated with the second one of the multiple applications, to process the entity processing request and generate a second application process result; and transmit an automated communication to a third one of the multiple applications, the automated communication including the first application process result and the second application process result.

3. The integrated application system architecture of claim 2, wherein the automated communication includes an application programming interface synchronous communication or a service call synchronous communication.

4. The integrated application system architecture of claim 1, wherein the automated communication includes an application programming interface asynchronous communication or a service call asynchronous communication.

5. The integrated application system architecture of claim 1, wherein the automated communication includes at least one of a message queue destination, a Kafka message, a fire and forget application programming interface call, a fire and forget service call, or an event-based interaction communication.

6. The integrated application system architecture of claim 1, wherein the result map set is stored in a structured data format in a database of the memory hardware.

7. The integrated application system architecture of claim 1, wherein the result map set is stored in an unstructured data format in a database of the memory hardware.

8. The integrated application system architecture of claim 1, wherein the first application process result includes at least one of a workflow processing failure identifier and a workflow processing success identifier.

9. The integrated application system architecture of claim 1, wherein the result mesh includes all combinations of processing paths for the entity processing request through one or more of the multiple applications, according to multiple result sets corresponding to the multiple applications as stored in the result map set.

10. The integrated application system architecture of claim 1, wherein the multiple applications are integrated in a business process management (BPM) system architecture.

11. The integrated application system architecture of claim 10, wherein the BPM system architecture includes a pharmaceutical claim processing system.

12. The integrated application system architecture of claim 10, wherein the memory hardware is configured to store the result map set and the result mesh as a PEGA system decision table.

13. The integrated application system architecture of claim 1, wherein multiple applications are integrated in a business process management (BPM) system architecture for a pharmaceutical claim processing system.

14. The integrated application system architecture of claim 13, wherein storing includes storing the result map set and the result mesh as a PEGA system decision table.

15. A method of transmitting automated communications within an integrated application system architecture, the method comprising:

identifying, by processor hardware, each of multiple applications in an integrated application system architecture, the multiple applications integrated with one another via multiple automated communication channels, each of the multiple applications configured to execute at least one workflow process associated with the application;

for each identified application:

obtaining at least one input to the identified application and at least one output to the identified application;

defining a result set for the identified application according to the at least one input, the at least one output, and the at least one workflow process associated with the application; and storing the result set an as entry in a result map set of memory hardware;

determining a result mesh according to each result set stored in the result map set;

receiving an entity processing request;

executing, via a first one of the multiple applications, the at least one workflow process associated with the first one of the multiple applications, to process the entity processing request and generate a first application process result;

transmitting an automated communication to a second one of the multiple applications, the automated communication including the first application process result;

receiving an entity processing status query;

obtaining at least one automated communication from one of the multiple applications, the at least one automated communication associated with the entity processing request corresponding to the entity processing status query; and returning an entity processing result status according to one or more application process results included in the at least one automated communication.

16. The method of claim 15, further comprising:

executing, via a second one of the multiple applications, the at least one workflow process associated with the second one of the multiple applications, to process the entity processing request and generate a second application process result; and transmitting an automated communication to a third one of the multiple applications, the automated communication including the first application process result and the second application process result.

17. The method of claim 16, wherein the automated communication includes an application programming interface synchronous communication or a service call synchronous communication.

18. The method of claim 15, wherein the automated communication includes an application programming interface asynchronous communication or a service call asynchronous communication.

19. The method of claim 15, wherein the automated communication includes at least one of a message queue destination, a Kafka message, a fire and forget application programming interface call, a fire and forget service call, or an event-based interaction communication.

20. The method of claim 15, wherein the result map set is stored in a structured data format in a database of the memory hardware.

21. The method of claim 15, wherein the result map set is stored in an unstructured data format in a database of the memory hardware.

22. An integrated application system architecture comprising:

multiple applications integrated with one another via multiple automated communication channels, each of the multiple applications configured to execute at least one workflow process associated with the application;

memory hardware configured to store a result map set, a result mesh, and computer-executable instructions; and processor hardware configured to execute the computer-executable instructions to:

identify each of the multiple applications in the integrated application system architecture;

for each identified application:

obtain at least one input to the identified application and at least one output to the identified application;

define a result set for the identified application according to the at least one input, the at least one output, and the at least one workflow process associated with the application; and store the result set an as entry in the result map set;

determine the result mesh according to each result set stored in the result map set;

receive an entity processing request;

execute, via a first one of the multiple applications, the at least one workflow process associated with the first one of the multiple applications, to process the entity processing request and generate a first application process result, wherein the result mesh includes all combinations of processing paths for the entity processing request through one or more of the multiple applications, according to multiple result sets corresponding to the multiple applications as stored in the result map set, wherein the multiple applications are integrated in a business process management (BPM) system architecture.

\* \* \* \* \*